UNITED STATES PATENT OFFICE 2,574,935

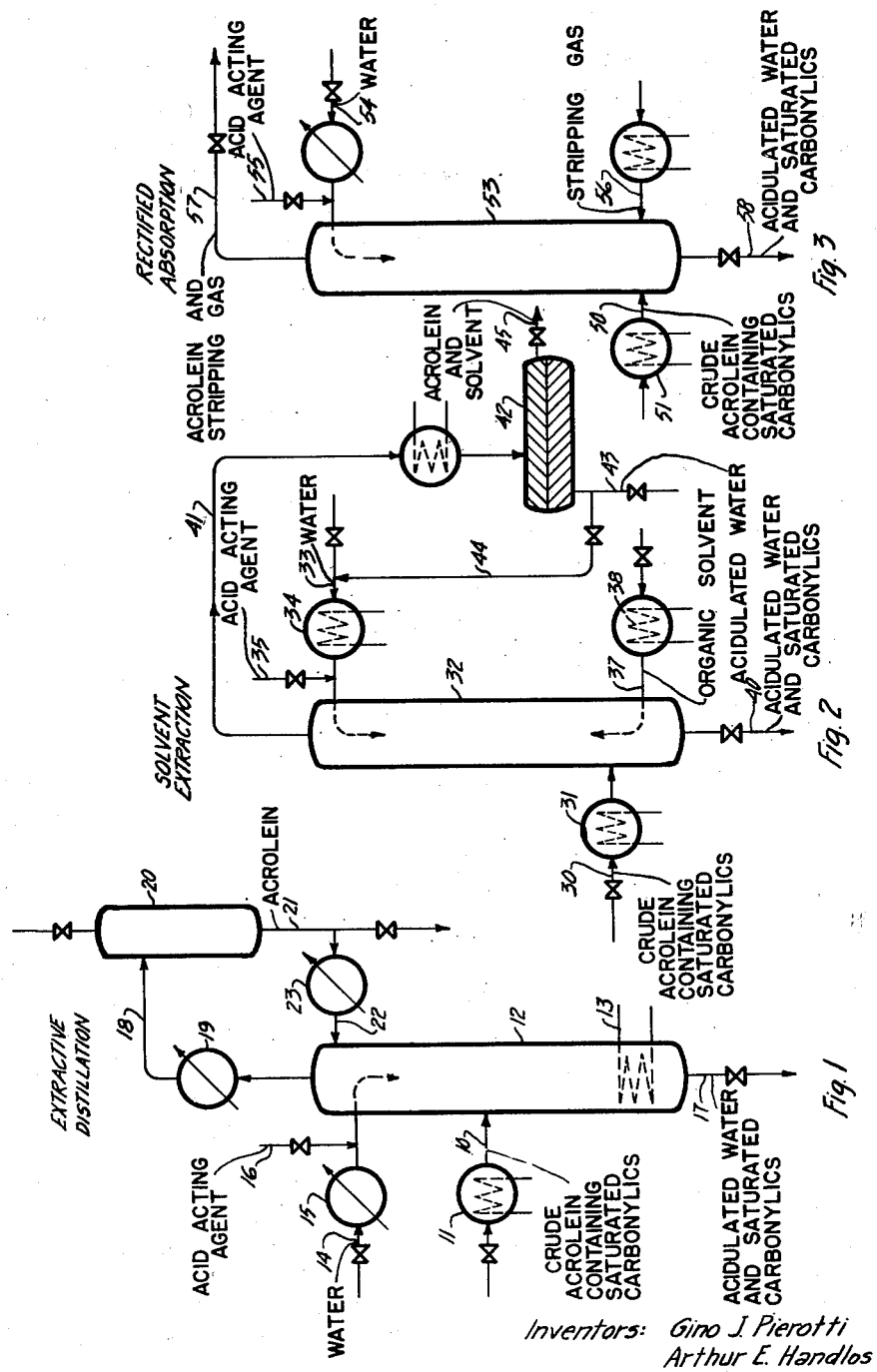

SEPARATION OF SATURATED FROM UN-SATURATED ALDEHYDES

Gino J. Pierotti, Albany, Arthur E. Handlos, Berkeley, and Charles M. Reider, Alameda, Calif., assignors to Shell Development Company, San Francisco, Calif., a corporation of Delaware Application February 4, 1950, Serial No. 142,496

15 Claims. (Cl. 202—39.5)

This invention relates to improvements in the resolution of organic mixtures capable of being segregated into dissimilar fractions or components by extraction with the aid of water as a solvent. The invention relates more particularly to the separation of aliphatic unsaturated aldehydes from admixture with saturated carbonylic compounds not readily separable therefrom by practical scale fractionating means. A specific aspect of the invention relates to the separation of acrolein from admixture with propionaldehyde and/or acetone.

Certain mixtures not readily separable into component parts by practical scale fractionating means are capable of resolution into component fractions or constituents by effecting the separation in the presence of water as a solvent. Thus, in copending applications Serial Nos. 1,314 and 49,816, filed January 9, 1948 and September 17, 1948, respectively, which matured into U. S. Patents Nos. 2,514,966 and 2,514,967, respectively, of which copending applications the present application is a continuation-in-part, methods are disclosed and claimed enabling the separation by extractive distillation in the presence of water of unsaturated aldehydes from admixture with saturated carbonylic compounds not readily separable therefrom by ordinary practical scale fractionating means. The methods of these copending applications enable the separation, for example, of acrolein from admixed saturated carbonylic compounds such as acetaldehyde, acetone, propionaldehyde, etc. They are of particular value in the separation of unsaturated aldehydes from saturated carbonylic compounds having closely approximating boiling temperatures, such as the separation of acrolein from admixed propionaldehyde. Other methods of effecting the resolution of such mixtures under extraction conditions with the aid of water as solvent comprise, for example, solvent extraction with water in the presence of a secondary organic solvent which is immiscible with water, such as described and claimed in copending application Serial No. 84,074, filed March 29, 1949; or by rectified absorption using water as a solvent as described and claimed in copending application Serial No. 87,608, filed April 15, 1949, which matured into U. S. Patent 2,514,968.

In such methods, bringing within the realm of practicability the resolution of complex mixtures, the residence time of the charge within the extractive separation zone is often relatively long when substantial separation of a particular fraction or component is required. The effect of such prolonged residence time is felt more acutely in those situations where it is intended to employ a type of apparatus designed to function with relatively rapid throughput rates, such as, for example, the fractionation and extraction processes effected in apparatus of the centrifugal or rotary contacter type. Means enabling the reduction of residence time of the charge within the separation apparatus, thereby enabling the use of substantially faster throughput rates than possible heretofore in carrying out said resolutions in conventional equipment and making possible the use of types of apparatus designed for rapid throughput rates with relatively small capacity, are therefore greatly desired.

It is an object of the present invention to provide an improved process for the more efficient resolution of complex mixtures of normally liquid organic compounds capable of being segregated into dissimilar fractions or components by treatment under extractive conditions using water as a solvent.

A further object of the invention is the provision of an improved process for the more efficient separation under extractive conditions of an aliphatic unsaturated aldehyde from admixture with saturated carbonylic compounds not readily separable therefrom by practical scale fractionating means.

Another object of the invention is the provision of an improved process for the more efficient separation under extractive conditions of an alpha,beta-unsaturated aliphatic aldehyde from admixture with saturated carbonylic compounds having the same number of carbon atoms to the molecule.

Still another object of the invention is the provision of an improved process enabling the more efficient separation under extractive conditions of an alpha, beta-unsaturated aliphatic aldehyde from admixture with a saturated aliphatic aldehyde and/or ketone having the same number of carbon atoms to the molecule.

A particular object of the invention is the provision of an improved process enabling the more efficient separation of acrolein from mixtures comprising acrolein in admixture with propionaldehyde and/or acetone. Other objects and advantages of the invention will become apparent from the following detailed description thereof.

In accordance with the present invention substantial improvement is obtained in the resolution of complex mixture capable of being segregated into dissimilar fractions or components by treatment under extractive conditions, such as, extractive distillation, solvent extraction, rectified absorption, and the like, by effecting said resolutions in the presence of water to which an acid-acting agent has been added. In accordance with the present invention, unsaturated aliphatic aldehydes are separated from mixtures comprising them in admixture with saturated carbonylic compounds by subjecting said mixtures to extractive distillation in the presence of acidulated water.

Without intent to limit the scope of the presently claimed invention by any theories advanced herein to set forth more fully the nature thereof, it is believed that in processes wherein resolution of organic mixtures is effected with the aid of water as a solvent, such as extractive distillation, solvent extraction, rectified absorption, etc., the separation of one or more components is dependent upon selective hydrate formation of one or more components of the mixture. Thus, in the separation of acrolein from saturated carbonylic compounds such as propionaldehyde, acetone, acetaldehyde, etc. by subjecting the mixture to extractive distillation in the presence of added water, it is believed that at the temperature conditions employed in such extractive distillation an acrolein will not undergo substantial hydrate formation whereas the saturated carbonylic constituents will do so. Efficient separation therefore renders necessary the use of throughput rates assuring sufficient length of residence time to enable attainment of equilibrium with respect to the formation of the hydrates of substantially all of the saturated carbonylic compounds in the mixture. In the case of extractive distillation in the presence of water of acrolein from saturated carbonylic impurities comprising acetone and propionaldehyde, such residence time may range as high as about 75 seconds per transfer stage when no acid-acting agent is employed.

The efficient separation realized with considerably reduced residence time, when operating in accordance with the present invention, is believed to be attributable to an increase in the degree and rate of selective hydrate formation in the presence of the added acid-acting agent under the conditions of the extractive separation.

Materials which are added to the water used as solvents in the improved processes of separation to attain the objects of the invention comprise acid-acting agents including catalysts such as, for example, the acid-acting hydration catalysts. Suitable acid-acting agents comprise, for example, the acids, acidic salts, acid-reacting substances or substances capable of acting as an acidifying agent under the conditions of the separation process and which will not themselves react to any substantial degree with components of the mixtures to be separated under the conditions of the extractive separation process. Suitable materials employed as acid-acting agents comprise, for example, the strong mineral acids such as sulfuric acid, phosphoric acid, metaphosphoric acid, phosphorous acid, pyrophosphoric acid, pyrosulfuric acid, nitric acid, perchloric acid, and the like. Mineral acid constituents and inorganic acid-acting salts, such as aluminum sulfate, sodium acid sulfate, sodium acid phosphate, and the like, may also be used. Other examples of suitable acid-acting agents include: monobasic organic acids, such as formic, acetic, propionic, butyric, isobutyric, valeric, benzoic, and their homologues and analogues, as well as polybasic acids, such as oxalic acid, malonic, succinic, and the like, or hydroxyl and/or carbonyl substituted acids, such as lactic, citric, malic, mesoxalic, or the like. Furthermore, it is also possible to use salts and compounds capable of acting as acid-acting materials under the conditions of operation. As such reference may be made to benzene sulfonic acid and its homologues and analogues, dialkyl and alkyl acid sulphates, alkylated phosphoric and sulfonic acids, halogenated organic acids, etc. It is to be understood that the particular acid-acting agent preferably employed in any specific operation will depend to some extent upon the specific components of the mixture being separated and the conditions employed. Thus, reactivity of a specific acid-acting agent with a specific compound will vary to some extent with operating conditions such as temperature; and in selecting a preferred acid-acting agent for a specific operation care is taken to choose one having no, or only a slight, tendency to enter into any substantial degree of reaction with the components of the mixture to be separated under the extractive separation conditions employed.

The invention may be applied broadly to the processes directed to the resolution of complex mixtures by treatment under conditions of extractive separation with the aid of water as a solvent. Examples of separations to which such processes are applied comprise the separation of an unsaturated aldehyde from a mixture comprising it in admixture with saturated carbonylic compounds such as saturated aldehydes and ketones. These processes are applied with advantage to the separation of unsaturated aliphatic aldehydes from mixtures comprising them in admixture with saturated aliphatic aldehydes and ketones having the same number of carbon atoms to the molecule as the unsaturated aldehyde. Because of its ability to effect in a single extractive operation the substantially complete removal from an unsaturated aldehyde a plurality of relatively close-boiling saturated carbonylic impurities, such as saturated ketones, and saturated aldehydes having the same number of carbon atoms to the molecule as the unsaturated aldehydes, the improved process of the invention is applied with particular advantage to the purification of the crude unsaturated aldehydes, such as the alpha,beta-unsaturated aldehydes obtained by the oxidation of the corresponding hydrocarbons. Specific examples of separations effected in such processes with the aid of water as solvent comprise the separation of acrolein from admixture with acetaldehyde, acrolein from admixture with acetone and/or propionaldehyde, methacrolein from admixture with one or more of the following acetone, propionaldehyde, isobutyraldehyde, etc.

In order to set forth more fully the nature of the invention, reference will be had, in the following detailed description thereof, to the attached drawing illustrating apparatus employed in three types of operations wherein complex mixtures are separated by treatment under conditions of extractive separation using water as a solvent.

In the separation of unsaturated aliphatic aldehydes from saturated carbonylic compounds by extractive distillation in the presence of water, the mixture to be separated, such as, for example, a mixture comprising acrolein in admixture with saturated carbonylic compounds (having boiling temperatures closely approximating that of acrolein) such as acetaldehyde acetone, propionaldehyde, is passed through valved line 10 provided with heat exchanger 11 into a suitable extractive distillation zone, comprising, for example, a column 12, provided with suitable reboiler or closed heating coil 13. The charge may be introduced into column 12 in liquid, vapor or mixed phase. Within column 12 the crude acrolein charge is subjected to extractive distillation conditions in the presence of added water introduced into the upper part of column 12 by means of valved line 14. Cooling means, such as, for example, a cooler 15, are provided to cool the water charge to column 12. An acid-acting agent, for example, a mineral acid, such as phosphoric acid, is introduced from an outside source into line 14 by means of a valved line 16, thereby acidulating the water entering column 12 through line 14. If desired, additional means assuring intimate mixing of the acid-acting agent with the water prior to entry into column 12 may be provided. Distillation conditions within column 12 are maintained within the range of, for example, from about −10° C. to about 35° C. Under these conditions the crude acrolein is extractively distilled in column 12 with the formation of liquid bottoms consisting essentially of water, acetaldehyde, propionaldehyde and acetone, and a vapor overhead consisting essentially of acrolein in a high state of purity free of any substantial amount of saturated carbonylic compounds and containing as little as from about 0.3% to about 10% or less, of water. Liquid bottoms are withdrawn from column 12 by means of a valved line 17. The liquid bottoms thus withdrawn from column 12 may be passed to any suitable means comprising, for example, distillation or the like to effect the recovery of the saturated carbonylic impurities from the acidulated water. The acidulated water thus recovered may be recycled to line 14 entering the top of column 12, thereby reducing to a relatively small amount the total overall amount of acid-acting agent used.

Acrolein overhead is taken from column 12 and passed through line 18 provided with cooler 19 into a receiver 20. Acrolein is withdrawn from receiver 20 by means of valved line 21. A part of the acrolein distillate thus passing through valved line 21 is diverted through valved line 22, provided with cooler 23, into the upper part of column 12 as reflux.

The minimum residence time of the charge within column 12 at the low temperature extractive distillation conditions, it has been found, is reduced materially by the addition of the acid-acting agent to the water used as solvent. The addition of only relatively small amounts of the phosphoric acid to column 12 reduced the minimum residence time from about 30 seconds to only 6 seconds under otherwise substantially identical conditions.

The advantages inherent in the addition of an acid-acting agent to the water employed as solvent are realized not only in the separation by extractive distillation but also, as pointed out above, when effecting the separation by other resolving processes conducted under conditions of extractive separation such as, solvent extraction wherein water is employed as solvent. Referring to Fig. II of the drawing, the crude acrolein, containing acrolein in admixture with acetone, acetaldehyde and propionaldehyde, may be charged through valved line 30, provided with means to control its temperature, such as heat exchanger 31, into an extraction zone, comprising, for example, column 32, at an intermediate point along the length thereof. Water is introduced into the upper part of column 32 by means of valved line 33, provided with heat exchanger 34. The acid-acting agent, for example, phosphoric acid, is introduced into line 33 from an outside source by means of a valved line 35. An organic solvent, for example, a normally liquid hydrocarbon, such as an aromatic hydrocarbon, such as, xylene or an aliphatic hydrocarbon such as butylene or isobutylene, is introduced into the lower part of column 32 by means of a valved line 37 provided with heat exchanger 38. The temperature within column 32 is maintained within the range of, for example, from about 0° C. to about 30° C. when removal of all propionaldehyde is desired. Somewhat higher temperatures may be employed if it is desired to separate only the acetone and acetaldehyde from the crude charge. Under these conditions a liquid phase, consisting essentially of acrolein and the added hydrocarbon solvent will be taken overhead from column 32, and a liquid phase consisting essentially only of water and saturated carbonylic compounds including acetone, acetaldehyde, propionaldehyde, etc., will be taken from the lower part of column 32. The water phase is taken from column 32 through valved line 40. The acrolein-containing phase is passed from the upper part of column 32 through line 41 into a separator 42 wherein any entrained acidulated water is separated from an acrolein-hydrocarbon-containing phase. Any acidulated water thus separated in separator 42 may be recycled through line 44 to line 33 entering the upper part of column 32. The water phase taken from column 32 through valved line 40, may be passed to any suitable means, such as, for example, distillation to effect the separation of saturated carbonylic impurities from acidulated water. The acidulated water thus recovered may be returned in part or entirety to line 33 entering the upper part of column 32.

Fig. III illustrates the separation of a complex organic mixture by means of a rectified absorption. Thus, crude acrolein, containing acrolein in admixture with saturated carbonylic impurities such as acetone, acetaldehyde, propionaldehyde and the like, is passed through line 50 provided with a heat exchanger 51 into a suitable rectified absorption zone comprising, for example, rectified absorber column 53. Water is introduced into the upper part of the rectified absorber column 53 by means of a valved line 54 provided with suitable temperature controlled means. The acid-acting agent, such as, for example, a mineral acid, such as phosphoric acid is introduced into line 54 from an outside source by means of valved line 55. A gaseous stripping medium is introduced into the lower part of column 53 by means of line 56. The rectified absorption is preferably carried out at a temperature in the range of from about 0° C. to about 30° C. Under these conditions acrolein will be stripped from saturated carbonylic impurities within rectified absorber column 53. A gaseous phase, consisting essentially of the acrolein and the gaseous stripping medium, free of any substantial amount of saturated carbonylic compounds, is taken overhead from column 53 by means of valved line 57, and passed to suitable means for the separation of acrolein from the stripping medium. Liquid comprising acidulated water and saturated carbonylics including acetone, acetaldehyde and propionaldehyde is taken from the lower part of column 53 and passed to suitable means for the separation of the saturated carbonylics from the acidulated water. The acidulated water thus recovered may be returned in part or entirety to the upper part of rectified absorber column 53.

Although the foregoing description of the invention has stressed the separation of acrolein and methacrolein from crude mixtures containing these unsaturated aldehydes in admixture with saturated carbonylic compounds, it is to be understood that the invention is in no wise limited thereto and that it may be applied broadly to the separation of complex organic mixtures capable of separation into component parts under suitable conditions of extractive separation employing water as a solvent. Further examples of the separation of components from complex mixtures in accordance with the invention comprise: the separation of methyl ethyl ketone from admixture with diacetyl by extractive distillation in the presence of water as the solvent, the diacetyl component being selectively dissolved in the water; the separation of methanol from admixture with formaldehyde by rectified absorption using water as the solvent, the formaldehyde being selectively removed with the water.

It is to be noted that the acid-acting agent is added to the water which is used as solvent in the separation process, and that such addition is made prior to the entry of the water into the separating zone and preferably prior to contact of said water with any substantial amount of the mixture to be subjected to the separation operation.

The amount of acid-acting agent to be added to the water will depend to some extent upon the particular mixture being subject to the conditions of extractive separation, the specific conditions employed therein, and upon the degree of reduction in residence time over that obtainable in the absence of any acid-acting agent which it is desired to obtain. In the separation of unsaturated aldehydes from mixtures comprising them in admixture with saturated carbonylic compounds such as saturated aliphatic aldehydes and ketones, it has been found that the addition of the acid-acting agent in an amount resulting in a hydrogen ion concentration in the acidulated water of from about 1.0 to about 5.0 in terms of pH values is satisfactory. When separating unsaturated aliphatic aldehydes having three and four carbon atoms to the molecule, such as, for example, acrolein and methacrolein, from mixtures comprising them in admixture with one or more saturated carbonylic compounds such as acetone, propionaldehyde, acetaldehyde, isobutyraldehyde, etc., the maintenance of the hydrogen ion concentration in the acidulated water charged to the system in the range of from about 2.0 to about 4.0 in terms of pH values is preferred. In the separation of an unsaturated aliphatic aldehyde having from three to four carbon atoms to the molecule by extractive distillation from mixtures containing the unsaturated aldehydes in admixture with saturated carbonylic compounds having three to four carbon atoms to the molecule using water acidulated with phosphoric acid as solvent, it is preferred to maintain the concentration of the phosphoric acid in the water used as solvent in the range of from about 0.005 to about 1.0 and still more preferably from about 0.01 to about 0.10% by weight. Addition of the acid in amounts substantially exceeding the maximum range set forth will result in inability to attain any substantial improvement in degree of separation. It is believed that this is attributable to at least some degree to hydration of components which it is desired to separate and the efficient separation of which is dependent upon selective hydration of only a portion of the compounds.

The effect of residence time, and acid concentration, on the separation of acrolein from admixture with propionaldehyde in extractive distillation using water as solvent was determined by effecting the separation in a series of operations executed in a bubble plate-containing apparatus. The residence time on the bubble plate and the acid concentration in the water used as solvent were substantially the only factors which were varied during the series of otherwise comparative operations. Propionaldehyde-acrolein feed was introduced as a vapor, and the relative volatilities were calculated from analysis of the overhead and the liquid solvent phase. The data obtained are set forth in the following table:

*Effect of residence time and acid concentration on the separation of acrolein-propionaldehyde*

| Run | Residence Time, sec. | Solvent | | Temp., °C., on Tray | Volatility Ratio Acrolein/Propionaldehyde | Equilibrium Volatility Ratio, Propionaldehyde |
|---|---|---|---|---|---|---|
| | | Per Cent W. $H_3PO_4$ | pH | | | |
| 1 | 6-8 | 0.00 | 6.6 | 6.5-9.0 | 0.70 | 1.70-1.61 |
| 2 | 6-8 | 0.106 | 2.4 | 8.0 | 1.52 | 1.65 |
| 3 | 6-8 | 0.051 | 2.5 | 8.5-9.0 | 1.69 | 1.63-1.61 |
| 4 | 6-8 | 0.0265 | 2.75 | 8.0 | 1.25 | 1.65 |
| 5 | 6-8 | 0.00425 | 3.25 | 8.2 | 1.19 | 1.64 |
| 6 | 22-27 | 0.00 | 6.6 | 10.0 | 1.13 | 1.58 |
| 7 | 22-27 | 0.00 | 6.6 | 10.0 ca. | 1.04 | 1.58 |
| 8 | 22-27 | 1.2 | | 10.0 | 1.74 | 1.58 |
| 9 | 22-27 | 0.102 | 2.4 ca. | 7.0-8.0 | 1.63 | 1.68-1.65 |
| 10 | 22-27 | 0.051 | 2.4 ca. | 8.0-9.0 | 1.50 | 1.65-1.61 |
| 11 | 22-27 | 0.0265 | 2.8 | 9.0-10.0 | 1.67 | 1.61-1.58 |
| 12 | 30-40 | 0.00 | 6.6 | 7.8 | 1.3 | 1.65 |
| 13 | 30-40 | 0.004 ca. | 2.8 | 9.4 | 1.74 | 1.60 |
| 14 | 30-40 | 0.027 ca. | 2.7 | 9.2 | 1.61 | 1.61 |
| 15 | 30-40 | | 4.1 | 8.2 | 1.26 | 1.64 |
| 16 | 30-40 | | 8.1 | 8.0-8.5 | 1.07 | 1.65-1.63 |
| 17 | 30-40 | | 9.0 | 9.0-10.2 | 1.45 | 1.61-1.57 |

It is apparent from the foregoing data that an acid concentration of 0.05% by weight in the water (that is a pH of about 2.46) is sufficient to establish essentially complete equilibrium with a residence time of only about 6 to 8 seconds.

The substantial reduction in residence time made possible by the present invention in the separation of complex organic mixtures by treatment under conditions of extraction separation wherein water is used as a solvent is further illustrated by the following example:

EXAMPLE

A mixture of acrolein and propionaldehyde was subjected to an extractive distillation wherein water, to which no acid-acting agent had been added, was used as the solvent. The conditions employed and the results obtained are indicated in column "A" of the following table. The operation was repeated under substantially identical conditions with the exception that acidulated water having a pH of about 2.46 (that is water containing 0.05% by weight of phosphoric acid) was employed as the solvent in the extractive distillation. Conditions employed and results obtained in the extractive distillation are indicated in the column "B" of the following table:

*Extractive distillation of acrolein-propionaldehyde with water containing 0.05% W. phosphoric acid as solvent*

|  | A | B |
|---|---|---|
| Propionaldehyde in Feed, Per Cent W | 18.5 | 12.2 |
| Propionaldehyde in Overhead, Per Cent W | 22.6 | 1.83 |
| Propionaldehyde in Bottoms, Per Cent W | 17.9 | 14.9 |
| Water on Plates, Per Cent W | 83–87 | 83–87 |
| Number of Actual Plates | 15 | 15 |
| Residence Time per Plate, Seconds | 6–8 | 6–8 |
| Top Pressure, mm | 75 | 75 |
| Bottom Pressure, mm | 92 | 95 |
| Temperature, °C.: |  |  |
| Solvent | 7.5 | 4.0 |
| Overhead |  | 0.6 |
| Solvent Port | −2.8 | 1.0 |
| Feed Port | 7.8 | 11.5 |
| Kettle | 7.0 | 9.5 |
| Reflux/Product | 3.9 | 3.8 |
| Plate Efficiency, Per Cent |  | 40–50 |

The invention claimed is:

1. In the process for separating acrolein from a mixture containing said acrolein in admixture with propionaldehyde wherein said mixture is subjected to an extractive separation at a temperature of from about −10 to 35° C. using water as a solvent, the improvement which comprises incorporating in said water a mineral acid in controlled amount to maintain the hydrogen ion concentration in said water in the range of from about 1.0 to about 5.0 in terms of pH values.

2. In the process for separating acrolein from a mixture containing said acrolein in admixture with propionaldehyde wherein said mixture is subjected to an extractive separation at a temperature of from about −10 to 35° C. using water as a solvent, the improvement which comprises incorporating in said water from about .005 to about 1.0% by weight of phosphoric acid.

3. The process in accordance with claim 2 wherein said extractive separation is an extractive distillation.

4. In the process for separating acrolein from a mixture containing said acrolein in admixture with propionaldehyde wherein said mixture is subjected to an extractive separation at a temperature of from about −10 to 35° C. using water as a solvent, the improvement which comprises incorporating in said water an acid hydration catalyst in controlled amount to maintain the hydrogen ion concentration in said water in the range of from about 1.0 to about 5.0 in terms of pH values.

5. In the process for separating acrolein from a mixture containing said acrolein in admixture with saturated carbonylic impurities comprising propionaldehyde wherein said mixture is subjected to an extractive separation at a temperature of from about −10 to 35° C. using water as a solvent, the improvement which comprises incorporating in said water a mineral acid in controlled amount to maintain the hydrogen ion concentration in said water in the range of from about 1.0 to about 5.0 in terms of pH values.

6. In the process for separating acrolein from a mixture containing said acrolein in admixture with saturated carbonylic impurities wherein said mixture is subjected to an extractive separation at a temperature of from about −10 to 35° C. using water as a solvent, the improvement which comprises incorporating in said water an acid-acting agent in controlled amount to maintain the hydrogen ion concentration in said water in the range of from about 1.0 to about 5.0 in terms of pH values.

7. The process in accordance with claim 6 wherein said extractive separation is an extractive distillation.

8. In the process for separating an unsaturated aliphatic aldehyde having from three to four carbon atoms to the molecule from a mixture comprising said unsaturated aldehyde in admixture with saturated carbonylic compounds having from three to four carbon atoms to the molecule wherein said mixture is subjected to an extractive separation at a temperature of from about −10 to 35° C. using water as a solvent, the improvement which comprises incorporating in said water a mineral acid in controlled amount to maintain the hydrogen ion concentration in said water in the range of from about 1.0 to about 5.0 in terms of pH values.

9. The process in accordance with claim 8 wherein said extractive separation is an extractive distillation.

10. In the process for separating an unsaturated aliphatic aldehyde from a mixture containing said unsaturated aldehyde in admixture with saturated carbonylic compounds wherein said mixture is subjected to an extractive separation at a temperature below about 35° C. using water as a solvent, the improvement which comprises incorporating in said water a mineral acid in controlled amount to maintain the hydrogen ion concentration in said water in the range of from about 1.0 to about 5.0 in terms of pH values.

11. The process in accordance with claim 10 wherein said extractive separation is an extractive distillation.

12. In a process for resolving organic mixtures consisting essentially of an unsaturated aliphatic aldehyde in admixture with saturated carbonylic compounds in which said mixtures are segregated into dissimilar fractions by treatment under conditions of extractive separation at a temperature below about 35° C. wherein water is used as a solvent, one of said dissimilar fractions containing unsaturated aliphatic aldehyde and another of said dissimilar fractions containing saturated carbonylic compounds the improvement which comprises incorporating in said water a mineral acid in controlled amount to maintain the hydrogen ion concentration in said water in the range of from about 1.0 to about 5.0 in terms of pH values.

13. The process in accordance with claim 12 wherein said mineral acid is phosphoric acid.

14. In a process for resolving organic mixtures consisting essentially of an unsaturated aliphatic aldehyde in admixture with saturated carbonylic compounds in which said mixtures are segregated into dissimilar fractions by treatment under conditions of extractive separation at a temperature below about 35° C. wherein water is used as a solvent, one of said dissimilar fractions containing unsaturated aliphatic aldehyde and another of said dissimilar fractions containing saturated carbonylic compounds the improvement which comprises incorporating in said water an acid-acting agent in controlled amount to maintain the hydrogen ion concentration in said water in the range of from about 1.0 to about 5.0 in terms of pH values.

15. The process in accordance with claim 14 wherein said extractive separation is an extractive distillation.

GINO J. PIEROTTI.
ARTHUR E. HANDLOS.
CHARLES M. REIDER.

REFERENCES CITED

The following references are of record in the file of this patent:

UNITED STATES PATENTS

| Number | Name | Date |
|---|---|---|
| 996,328 | Guellaume | June 27, 1911 |
| 1,929,901 | Ricard et al. | Oct. 10, 1933 |
| 2,080,111 | Bump | May 11, 1937 |
| 2,179,991 | Bright | Nov. 14, 1939 |
| 2,261,704 | Wagner | Nov. 4, 1941 |
| 2,290,636 | Deanesly | July 21, 1942 |
| 2,514,966 | Pierotti et al. | July 11, 1950 |
| 2,514,967 | Pierotti et al. | July 11, 1950 |